United States Patent
Parsons et al.

(10) Patent No.: US 6,886,665 B2
(45) Date of Patent: May 3, 2005

(54) LUBRICATION SYSTEM VALVE

(75) Inventors: Douglas A. Parsons, Canton, CT (US); Kenneth Marks, Southwick, MA (US)

(73) Assignee: Hamilton Sundstrand, Windsor Locks, CT (US)

( * ) Notice: Subject to any disclaimer, the term of this patent is extended or adjusted under 35 U.S.C. 154(b) by 67 days.

(21) Appl. No.: 10/313,859

(22) Filed: Dec. 6, 2002

(65) Prior Publication Data

US 2004/0108005 A1 Jun. 10, 2004

(51) Int. Cl.$^7$ ................................................. F01M 1/00
(52) U.S. Cl. ........................ 184/6; 184/6.11; 60/39.08
(58) Field of Search .................... 184/6, 6.11; 60/39.08

(56) References Cited

U.S. PATENT DOCUMENTS

| | | | |
|---|---|---|---|
| 2,440,980 A | * | 5/1948 | Sheppard .................... 184/6.11 |
| 3,115,160 A | | 12/1963 | Emrie |
| 3,618,710 A | * | 11/1971 | DeLisse et al. ............ 184/6.11 |
| 3,713,538 A | | 1/1973 | Kass |
| 4,525,995 A | * | 7/1985 | Clark ......................... 60/39.08 |
| 4,891,934 A | * | 1/1990 | Huelster .................... 60/39.08 |
| 4,932,501 A | * | 6/1990 | Decker ....................... 184/6.11 |
| 4,974,410 A | * | 12/1990 | Wright et al. ............... 60/39.08 |

FOREIGN PATENT DOCUMENTS

| | | |
|---|---|---|
| DE | 101 52 186 | 6/2003 |
| FR | 1 425 375 | 1/1966 |
| FR | 1 495 604 | 9/1967 |

OTHER PUBLICATIONS

European Search Report, Apr. 7, 2004.

* cited by examiner

Primary Examiner—John Fox
(74) Attorney, Agent, or Firm—Carlson, Gaskey & Olds

(57) ABSTRACT

A fluid scavenging system is provided for a lubrication system including a gas turbine engine having bearing compartments. A valve includes a housing with an outlet and a plurality of fluid inlets respectively in fluid communication with the bearing compartments. The valve includes a rotationally driven member arranged within the housing with the member having a plurality of ports arranged thereon each defining an arcuate slot. Each of the ports are selectively in fluid communication with one of the fluid inlets through the arcuate slot during rotation of the member for selectively permitting fluid flow between the opening of one of the fluid inlets through one of the corresponding ports in the member. A fluid pump is fluidly connected to the outlet for drawing fluid from each of the plurality of fluid compartments during fluid rotation of the member. The driven member rotates about an axis 360°, and preferably, the ports are respectively aligned with the fluid inlets for approximately at least 360° such that the pump does not run dry. The arcuate slots may overlap during a range of degrees such that more than one compartment is scavenged. The size of the arcuate slot and degrees through which the arcuate slot is in communication with its respective inlet determines the duration that a particular bearing compartment is scavenged and the volume of bearing fluid that may be removed from the compartment.

9 Claims, 2 Drawing Sheets

LUBRICATION SYSTEM VALVE

BACKGROUND OF THE INVENTION

This invention relates to a lubrication system, and more particularly, the invention relates to a valve used for scavenging lubricating fluid from separate compartments of a machine.

Gas turbine engines and other rotating machines typically have several bearing areas that must be lubricated and scavenged. On complex multi-shaft engines the number of individual bearing compartments can be as high as ten or more. Each bearing cavity must be scavenged separately to ensure that spent bearing oil is properly returned to the tank for reuse and not allowed to leak in the gas path of the engine where it may ignite.

A pump is used to scavenge the bearing cavities to remove the bearing oil. In the prior art, scavenging is typically accomplished by using separate scavenge pump elements for each compartment. That is, each bearing compartment has its own set of pump elements such that for complex multi-shaft engines there may be as many as ten or more sets of pump elements. This leads to a scavenge pump which is overly long and complex requiring many bearings, shafts, seals, and couplings. Therefore, what is needed is an improved lubrication system that scavenges each of the bearing compartments without using separate pump elements.

SUMMARY OF THE INVENTION AND ADVANTAGES

The present invention provides a fluid scavenging system for a lubrication system including a machine such as a gas turbine engine having a plurality of fluid compartments such as bearing compartments. A valve includes a housing with an outlet opening and a plurality of fluid inlets respectively in fluid communication with the bearing compartments. The valve includes a rotationally driven member arranged within the housing with the member having a plurality of ports arranged thereon each defining an arcuate slot that is preferably less than 360°. Each of the ports are selectively in fluid communication with one of the fluid inlets through the rotational arc during rotation of the member for selectively permitting fluid flow between the outlet opening and one of the fluid inlets through one of the corresponding ports in the member. A fluid pump is fluidly connected to the outlet opening in the valve for drawing fluid from each of the plurality of fluid compartments during fluid rotation of the member. The driven member rotates about an axis 360° and, preferably, the ports are respectively aligned with the fluid inlets for approximately at least 360° such that the pump does not run dry. The arcuate slots may overlap during a range of degrees such that more than one compartment is scavenged. The size of the arcuate slot and degrees through which the arcuate slot is in communication with its respective inlet determines the duration that a particular bearing compartment is scavenged and the volume of bearing fluid that may be removed from the compartment.

Accordingly, the above invention provides an improved lubrication system that scavenges each of the bearing compartments without using separate pump elements.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
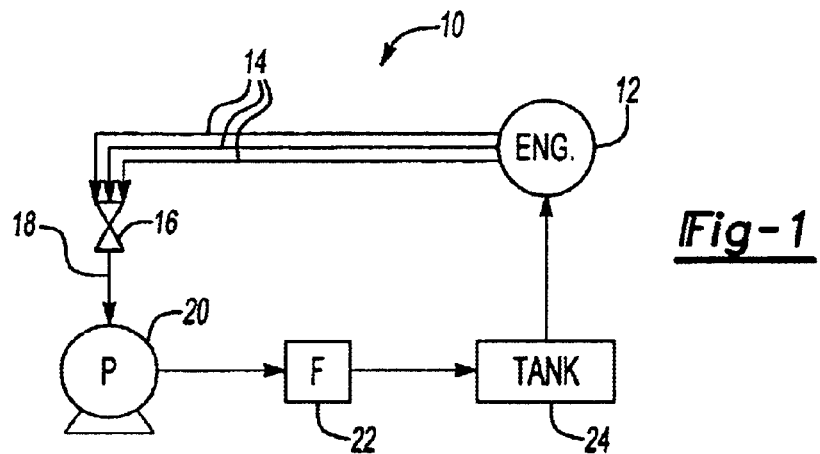
FIG. 1 is a schematic view of the present invention lubrication system.

A fluid scavenging system 10 is schematically depicted in FIG. 1 and represents a portion of a lubrication system. The system 10 includes a machine such as a gas turbine engine 12 having a plurality of fluid compartments such as bearing compartments that receive lubrication. These bearing compartments must be scavenged to ensure that all the bearing oil is removed to maintain desired operation of the engine 12. To this end, fluid conduits 14 are in fluid communication with each of the bearing compartments and are connected to a pump to pump the oil from the bearing compartments. Normally, the fluid conduits are respectively connected to a separate set of pump elements each of which separately pumps the bearing compartment. The present invention utilizes a valve 16 arranged between the fluid conduits 14 and the pump 20 to scavenge the oil from all of the bearing compartments using a single set of pump elements. The valve 16 includes a common fluid outlet 18 fluidly connected to the pump 20. A filter 22 may be arranged downstream from the pump 20 to filter the bearing oil prior to its return to a tank 24 for reuse. The oil in the tank 24 may then be pumped to the bearing compartments of the engine 12 for lubrication.

Figure 2:
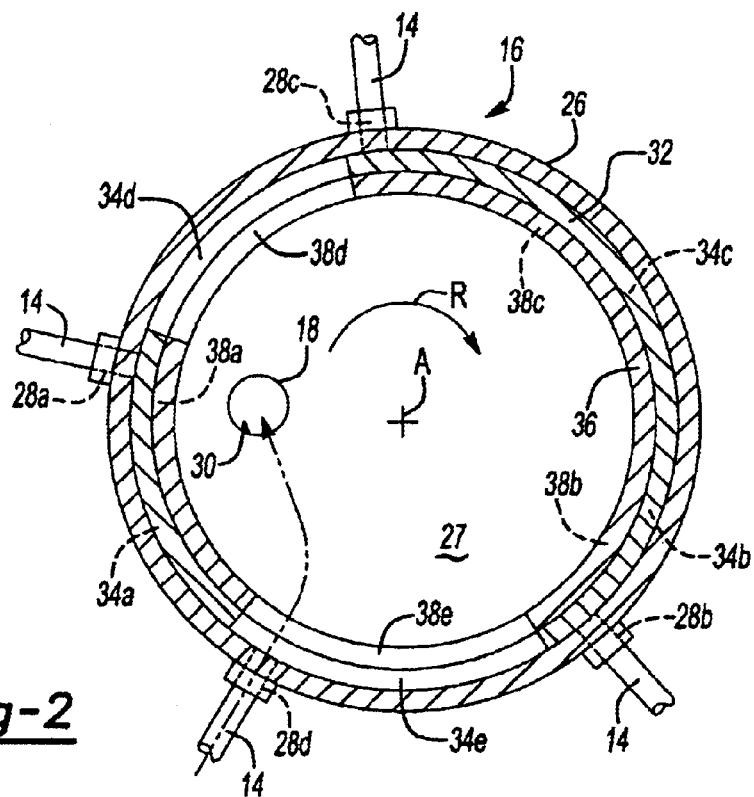
FIG. 2 is a cross-sectional view of the present invention multiplexing valve.

Referring to FIG. 2, the valve 16 includes a housing 26 to which the fluid conduits 14 are secured by suitable fittings. The housing 26 defines an interior fluid chamber 27 that is in fluid communication with the fluid outlet 18. The housing 26 has a plurality of fluid inlets 28a, 28b, 28c, and 28d each corresponding to and in fluid communications with one of the fluid conduits 14. The number of conduits depicted in the Figures is only exemplary and any number of conduits for a particular number of bearing compartments may be used. For example, FIG. 1 depicts only three fluid conduits 14 while FIGS. 2–4 depict a configuration utilizing four fluid conduits 14.

A rotating or driven member 36 is disposed within the fluid chamber 27 and separates the fluid inlets 28 from the fluid outlet 18, which defines the opening 30. Rotation of the driven member 36 about an axis A controls the flow from the bearing compartments through the opening 30. The driven member 36 selectively controls the scavenging of the bearing oil from each of the bearing compartments during rotation of the member 36 relative to the housing 26. Said another way, all of the bearing compartments are not scavenged at the same time, but rather, only a few or only one of the bearing compartments is scavenged during any given rotational position of the driven member 36.

Figure 3:
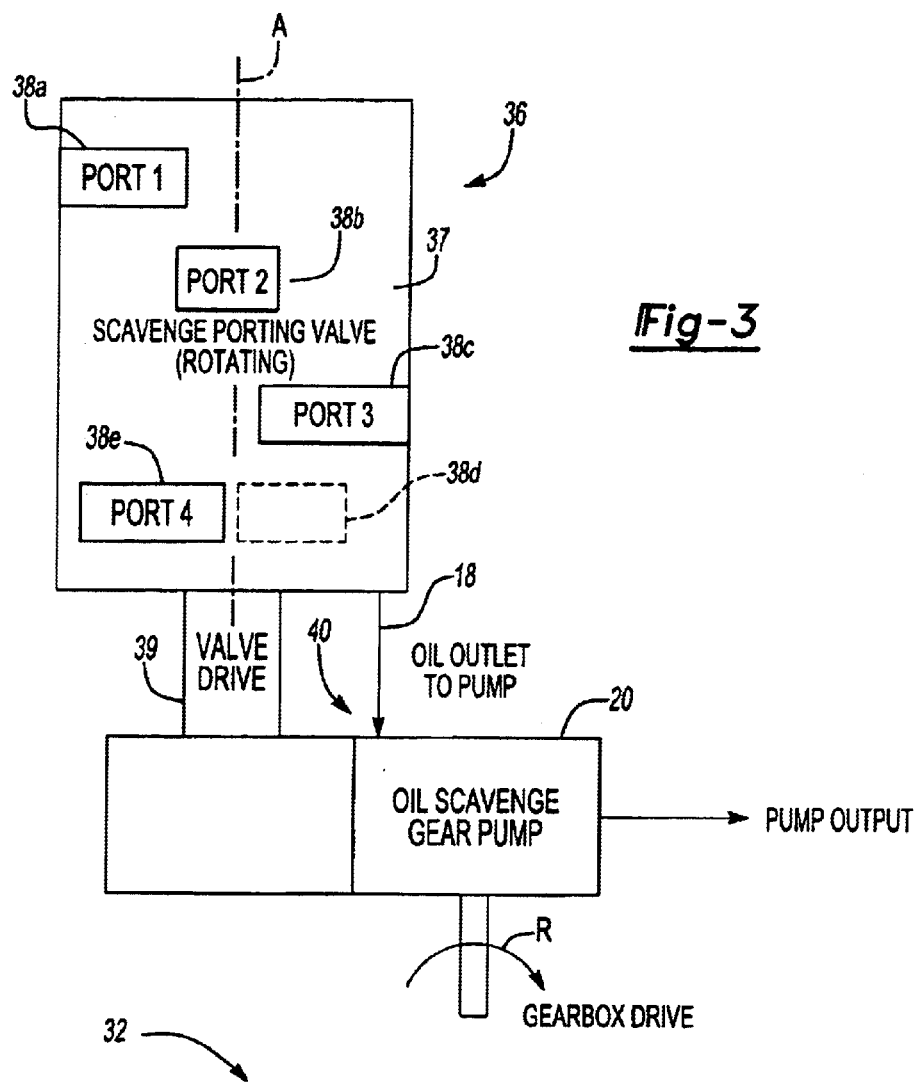
FIG. 3 is a schematic view of a pump and a portion of the present invention valve.
Figure 4:
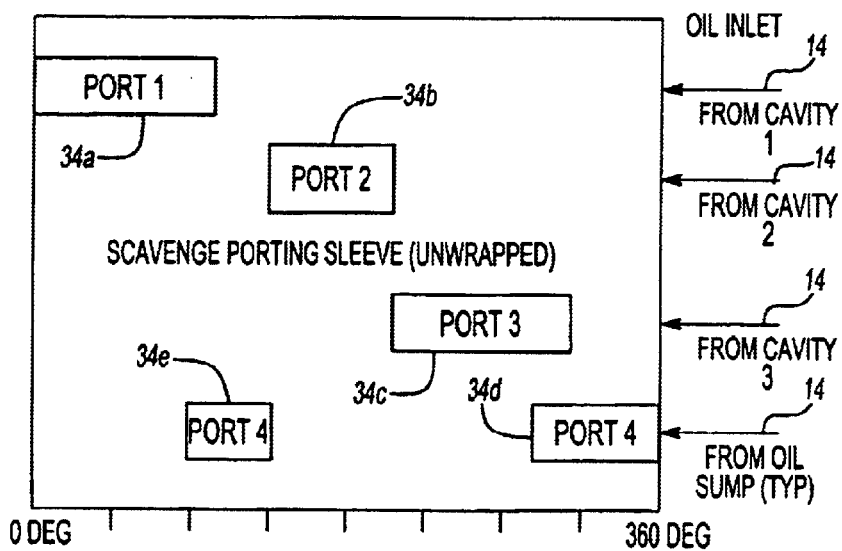
FIG. 4 is a schematic view of the present invention housing or sleeve unwrapped to depict the fluid inlets for 360°.

The member 36 includes a plurality of ports 38a, 38b, 38c, 38d, and 38e arranged about a cylindrical surface 37, shown in FIG. 3, of the member 36 with each of the ports 38 defining an arcuate slot during which a particular bearing compartment is in fluid communication with the opening 30.

A sleeve 32 may be arranged between the housing 26 and the member 39 to provide a desired frictional coefficient between the driven member and the surface in which the driven member is in engagement. That is, the housing 26 is typically constructed from a metal and it may be desirable to provide a surface constructed from a material other than metal or a dissimilar material to provide the desired characteristics between the member 36 and its support structure. The sleeve 32 may include ports 34a, 34b, 34c, 34d and 34e that are aligned with the fluid inlets 28 to selectively prevent fluid flow through the fluid chamber 27 between the opening 30 and a respective port 38 in the rotating member 36.

Referring to FIG. 3, the rotating member 36 may be driven by a shaft 39 that is coupled to the pump 20 by a gear set 40. It may be desirable that the valve 16 and the pump 20 be mechanically coupled together so that any pulsations in the pump 20 or as a result of the ports 38 opening and closing can be reduced or eliminated. The pump 20 may be rotationally driven directly or indirectly by the engine 12. Referring to FIGS. 3 and 4, the ports 34 and 38 may be an arcuate slot or window on the cylindrical surface of the member 36 and sleeve 32. The arcuate slot defines the duration of scavenging for a particular bearing compartment. As shown in FIG. 4, more than one port may be used for bearing compartment. The arcuate slot of a first port scavenges from a first bearing compartment during 0–100° of rotation of the driven member 36. The arcuate slot of a second port scavenges oil from a corresponding second bearing compartment for 135°–205° of rotation of the driven member 36. The arcuate slot of a third port scavenges oil from a corresponding third bearing compartment from 205°–315° of rotation of the driven member 36. A fourth set of ports scavenge oil from a fourth corresponding bearing compartment for 90°–135° and 290°–360° of rotation of the driven member. In this manner, rotation of the driven member 36 relative to the housing 26 selectively scavenges a bearing compartment for a particular range of degrees.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A fluid scavenging system comprising:
   a machine having a plurality of fluid compartments;
   a valve having a housing with an opening and a plurality of fluid inlets respectively in fluid communication with said plurality of fluid compartments, said valve including a rotationally driven member disposed within said housing with said member having a plurality of ports arranged thereon each defining an arcuate slot, each of said ports selectively in fluid communication with one of said plurality of fluid inlets through said arcuate slot during rotation of said member selectively permitting fluid flow between said opening and said one of said fluid inlets through said one of said ports; and
   a fluid pump fluidly connected to said opening for drawing fluid from said each of said plurality of fluid compartments during rotation of said member.

2. The system according to claim 1, wherein said machine is a gas turbine engine and said fluid compartments are separate bearing cavities.

3. The system according to claim 1, wherein said pump is rotational driven by said machine.

4. The system according to claim 1, wherein a tank is in fluid communication with said pump with said pump scavenging fluid from said fluid compartments through said valve and returning said fluid to said tank.

5. The system according to claim 1, wherein said pump and driven member are mechanically coupled together with said pump rotationally driving said driven member.

6. The system according to claim 5, wherein said pump and driven member are mechanically coupled together by a gear set.

7. The system according to claim 1, wherein said driven member rotates about said axis 360 degrees, and said ports are respectively aligned with said fluid inlets for approximately said 360 degrees.

8. A method of scavenging a plurality of fluid compartments comprising the steps of:
   a) rotating a valve member through a first range of degrees about an axis;
   b) aligning a first port in the valve member with a first housing aperture to provide fluid communication therewith throughout the first range;
   c) rotating the valve member through a second range of degrees about the axis;
   d) aligning a second port in the valve member with a second housing aperture to provide fluid communication therewith throughout the second range; and
   e) sequentially pumping fluid through the ports and corresponding housing apertures.

9. The method according to claim 8, wherein the ports are respectively aligned with the housing apertures for approximately said 360 degrees of rotation of the valve member about the axis.

* * * * *